US008875231B1

(12) United States Patent
Piercy et al.

(10) Patent No.: US 8,875,231 B1
(45) Date of Patent: Oct. 28, 2014

(54) COMMUNICATION PRIVACY SERVICES

(75) Inventors: Larry H. Piercy, St. Joseph, MO (US);
Trey A. Hilyard, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 2079 days.

(21) Appl. No.: 11/613,393

(22) Filed: Dec. 20, 2006

(51) Int. Cl.
*H04L 29/06* (2006.01)
(52) U.S. Cl.
USPC ............................................. 726/2; 713/151
(58) Field of Classification Search
USPC ........................................................ 726/1–3
See application file for complete search history.

(56) References Cited

U.S. PATENT DOCUMENTS

| | | | | |
|---|---|---|---|---|
| 5,590,184 | A * | 12/1996 | London | 379/142.09 |
| 5,670,950 | A * | 9/1997 | Otsuka | 455/411 |
| 5,832,072 | A * | 11/1998 | Rozenblit | 379/246 |
| 6,026,079 | A * | 2/2000 | Perlman | 370/260 |
| 6,097,937 | A * | 8/2000 | Sawyer | 455/406 |
| 6,961,334 | B1 * | 11/2005 | Kaczmarczyk | 370/354 |
| 7,110,522 | B1 * | 9/2006 | Cesario, Jr. | 379/265.01 |
| 7,698,217 | B1 * | 4/2010 | Phillips et al. | 705/40 |
| 2002/0084888 | A1 * | 7/2002 | Jin | 340/7.21 |
| 2002/0094806 | A1 * | 7/2002 | Kamimura | 455/415 |
| 2003/0037114 | A1 * | 2/2003 | Nishio et al. | 709/206 |
| 2004/0058672 | A1 * | 3/2004 | Lee et al. | 455/412.1 |
| 2005/0227678 | A1 * | 10/2005 | Agrawal et al. | 455/414.3 |
| 2006/0115060 | A1 * | 6/2006 | Benco et al. | 379/114.01 |

* cited by examiner

*Primary Examiner* — Eleni Shiferaw
*Assistant Examiner* — Phy Anh Vu

(57) ABSTRACT

A communications system comprising a service processing system configured to receive a privacy request indicating a communication comprising a first user associated with a first communication device and a second user associated with a second communication device, send a query indicating the communication to a privacy system, receive a privacy message indicating whether the second user is private, and send a privacy instruction to the first communication device; the privacy system configured to receive the query, determine a privacy list for the first user, process the query with the privacy list to determine whether the second user is on the privacy list, and send the privacy message to the service processing system indicating that the second user is private; and the first communication device configured to receive the privacy instruction, and update a log, wherein, according to the privacy instruction, the second user is not indicated.

19 Claims, 8 Drawing Sheets

COMMUNICATION PRIVACY SERVICES

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The invention relates to the field of communications, and in particular communication privacy services.

2. Description of the Prior Art

Communication devices are beset with privacy problems related to the tracking of communication sources and destinations via logs, both on the devices themselves and in related systems. A user wishing to keep private the contents of e-mails, text messages, internet relay chats, or the identity of other participants in communications is vulnerable to another person accessing that user's communication logs via the communication device, or even a bill for services related to the user's communication device.

A user could strictly police communication logs on a communication device so that private information could not be viewed by another picking up the device. However, a manual system for maintaining privacy is unreliable due to the likelihood of human error, and becomes unwieldy with a plurality of private communications. Further, a manual system does not address the problem of private information being accessible in a printed or electronic version of a bill for the communication device.

SUMMARY OF THE INVENTION

An embodiment of the invention helps solve the above problems and other problems by enabling a user to define a set of privacy participants with whom the user desires to maintain private communications, and upon communicating with those participants, to update communication and billing logs wherein the privacy participants are kept private.

An embodiment of the invention is a communications system that comprises a service processing system, a privacy system, and a first communication device. The service processing system receives a privacy request that indicates a communication comprising a first user associated with a first communication device and a second user associated with a second communication device. The service processing system sends a query indicating the communication to the privacy system. The privacy system receives the query, determines the privacy list for the first user, determines whether the second user is on the privacy list, and sends a privacy message to the service processing system. The service processing system sends a privacy instruction to the first communication device. The first communication device receives the privacy instruction, and updates a log indicating the communication, wherein the second user is not indicated.

In an embodiment of the invention, the first communication device deletes the second user from the log.

In an embodiment of the invention, the first communication device modifies the second user in the log.

In an embodiment of the invention, the first communication device sends the privacy request.

In an embodiment of the invention, the service processing system sends the privacy instruction to a billing system. The billing system updates a billing log wherein, according to the privacy instruction, the second user is not indicated.

In an embodiment of the invention, the first user updates the privacy list via a web interface.

In an embodiment of the invention, the service processing system receives the privacy request when the communication terminates.

In an embodiment of the invention, the log is an outgoing call log, an incoming call log, or a missed call log.

In an embodiment of the invention, the communication is a telephone call.

In an embodiment of the invention, the communication is a voice over Internet protocol (VOIP) call.

In an embodiment of the invention, the communication is a text message.

In an embodiment of the invention, the communication is an e-mail.

In an embodiment of the invention, a method of communication comprises receiving a privacy request indicating a communication comprising a first user associated with a first communication device and a second user associated with a second communication device; sending a query indicating the communication to a privacy system; receiving the query; determining a privacy list for the first user; processing the query and the privacy list to determine whether the second user is on the privacy list; sending a privacy message to the service processing system; receiving the privacy message indicating whether the second user is private; sending a privacy instruction to the first communication device; receiving the privacy instruction; and updating a log indicating the communication, wherein according to the privacy instruction, the second user is not indicated.

In an embodiment of the invention, a software product comprises a computer-readable medium carrying one or more sequences of instructions for operating a communications system wherein execution of the one or more sequences of instructions by one or more processors causes the one or more processors to receive a privacy request indicating a communication comprising a first user associated with a first communication device and a second user associated with a second communication device; send a query indicating the communication to a privacy system; receive the query; determine a privacy list for the first user; process the query with the privacy list to determine whether the second user is on the privacy list; send a privacy message to the service processing system indicating that the second user is private; receive the privacy message; send a privacy instruction to the first communication device; receive the privacy instruction; and update a log indicating the communication, wherein, according to the privacy instruction, the second user is not indicated.

BRIEF DESCRIPTION OF THE DRAWINGS

The same reference number represents the same element on all drawings.

DETAILED DESCRIPTION OF THE PREFERRED EMBODIMENT

FIGS. 1-8 and the following description depict specific embodiments of the invention to teach those skilled in the art how to make and use the best mode of the invention. For the purpose of teaching inventive principles, some conventional aspects have been simplified or omitted. Those skilled in the art will appreciate variations from these embodiments that fall within the scope of the invention. Those skilled in the art will appreciate that the features described below can be combined in various ways to form multiple embodiments of the invention. As a result, the invention is not limited to the specific embodiments described below, but only by the claims and their equivalents.

First Embodiment

FIGS. 1-6

Figure 1:
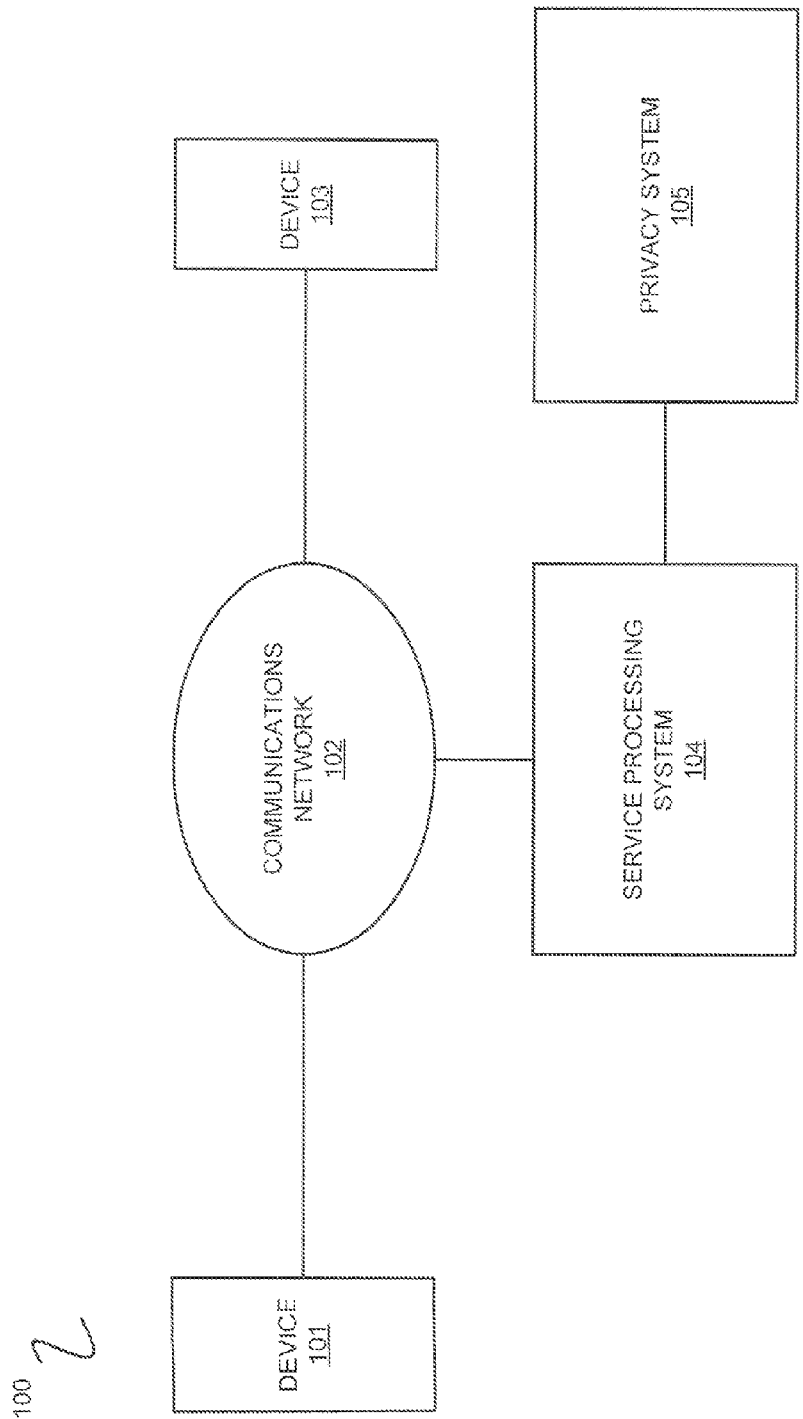
FIG. 1 illustrates a communications system in an embodiment of the invention.

FIG. 1 illustrates communications system 100 in an embodiment of the invention. Communications system 100 could include device 101, communications network 102, device 103, service processing system 104, and privacy system 105.

Device 101 could be connected to communications network 102. Device 103 could be connected to communications network 102. Communications network 102 could be connected to device 101, device 103, and service processing system 104. Service processing system 104 could be connected to communications network 102 and privacy system 105. Privacy system 105 could be connected to service processing system 104.

Device 101 and device 103 could be communications devices. Examples of communications devices are telephones, personal computers, and wireless handsets. Communications network 102 could be any network or collection of networks that facilitate telephone or data communications. The public switched telephone network (PSTN), wireless communications networks, and the Internet are examples of communications networks. Service processing system 104 could be any system that is capable of communication functionality. Communication functionality includes telephone call set-up, call termination, and text message and e-mail services. A mobile switching center (MSC), a telephone switch, a soft-switch, and servers for text-messaging, e-mail and internet relay chat (IRC) are examples of service processing systems. Privacy system 105 could be any system capable of determining a privacy list for a first user, receiving queries indicating a communication comprising a second user and a first user, determining whether the second user is on a privacy list, and sending a privacy message to service processing system 104.

Figure 2:
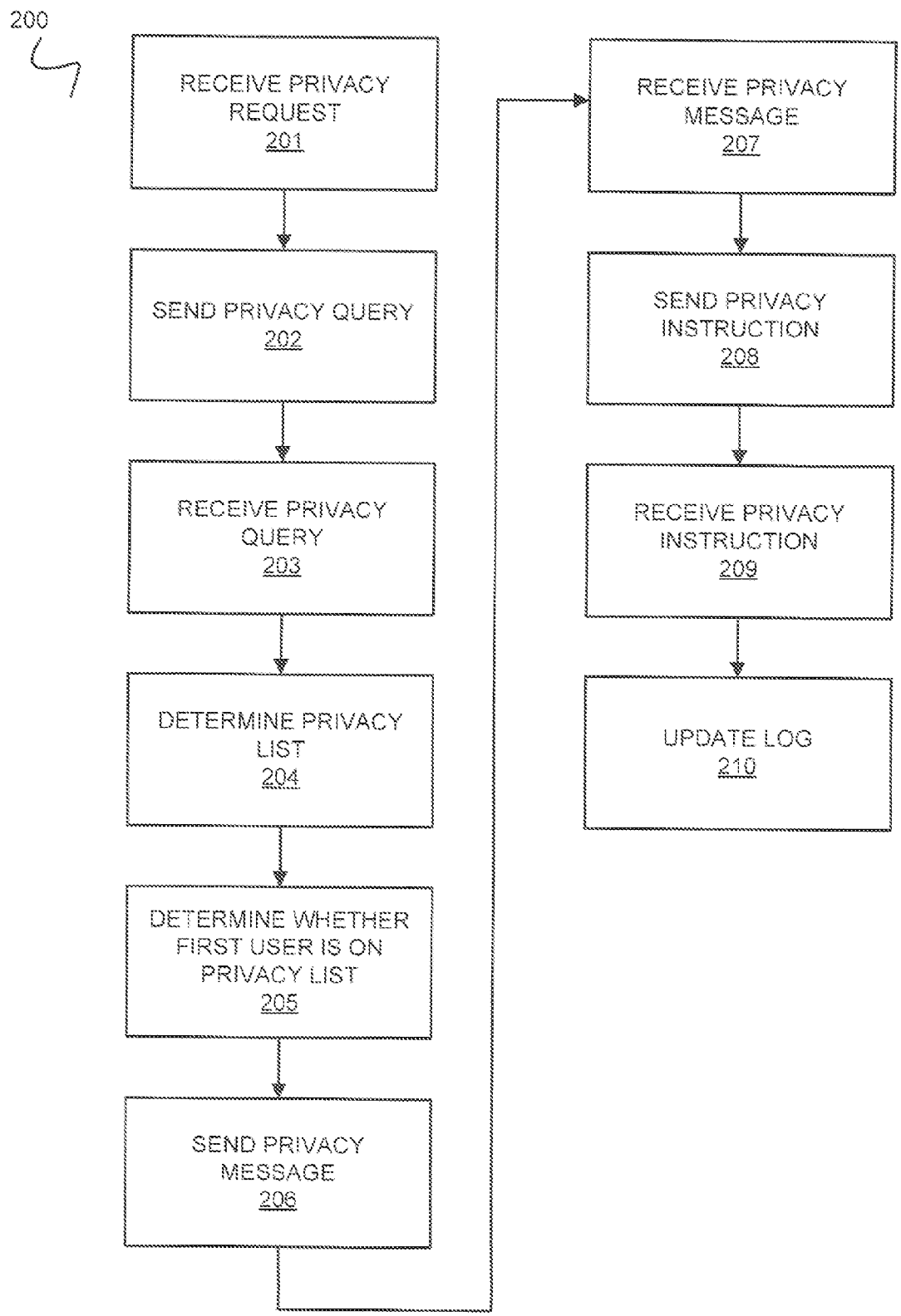
FIG. 2 illustrates a process flow in an embodiment of the invention.

FIG. 2 illustrates communications system 100 operation in an embodiment of the invention. A first user associated with device 101 could utilize a privacy service, wherein the first user could determine a privacy list for communications via device 101. The privacy list could identify users with whom the first user could maintain private communications. For example, it is well-known in the art for a telephone to maintain a log of dialed telephone numbers. By utilizing a privacy service, the first user could predetermine users that the first user does not want explicitly identified on the call logs. A first user associated with device 101 who wishes to keep communications with a second user associated with device 103 private, could have the second user recorded on the privacy list.

When a communication between device 101 and device 103 occurs, service processing system 104 could receive a privacy request. The privacy request could originate from device 101 as a message via short message service (SMS). (Step 201). Service processing system 104 could then send a privacy query to privacy system 105 and privacy system 105 could receive the privacy query. (Steps 202-203). Privacy system 105 could determine the privacy list for the first user. (Step 204). Privacy system 105 could then determine whether the second user is on the privacy list. (Step 205). Privacy system 105 could then send a privacy message to service processing system 104 and service processing system 104 could receive the privacy message. (Steps 206-207).

Service processing system 104 could send a privacy instruction to device 101 and device 101 could receive the privacy instruction. (Steps 208-209). Device 101 could then update a log wherein, according to the privacy instruction, the second user is not indicated. For example, device 101 could update the log by removing the second user's telephone number. Alternatively, device 101 could modify the content of the log by changing the dialed number. (Step 210). Those skilled in the art recognize that the log could also be an incoming call log, a mailbox for incoming or sent e-mails, a text message log, or an IRC log.

Figure 3:
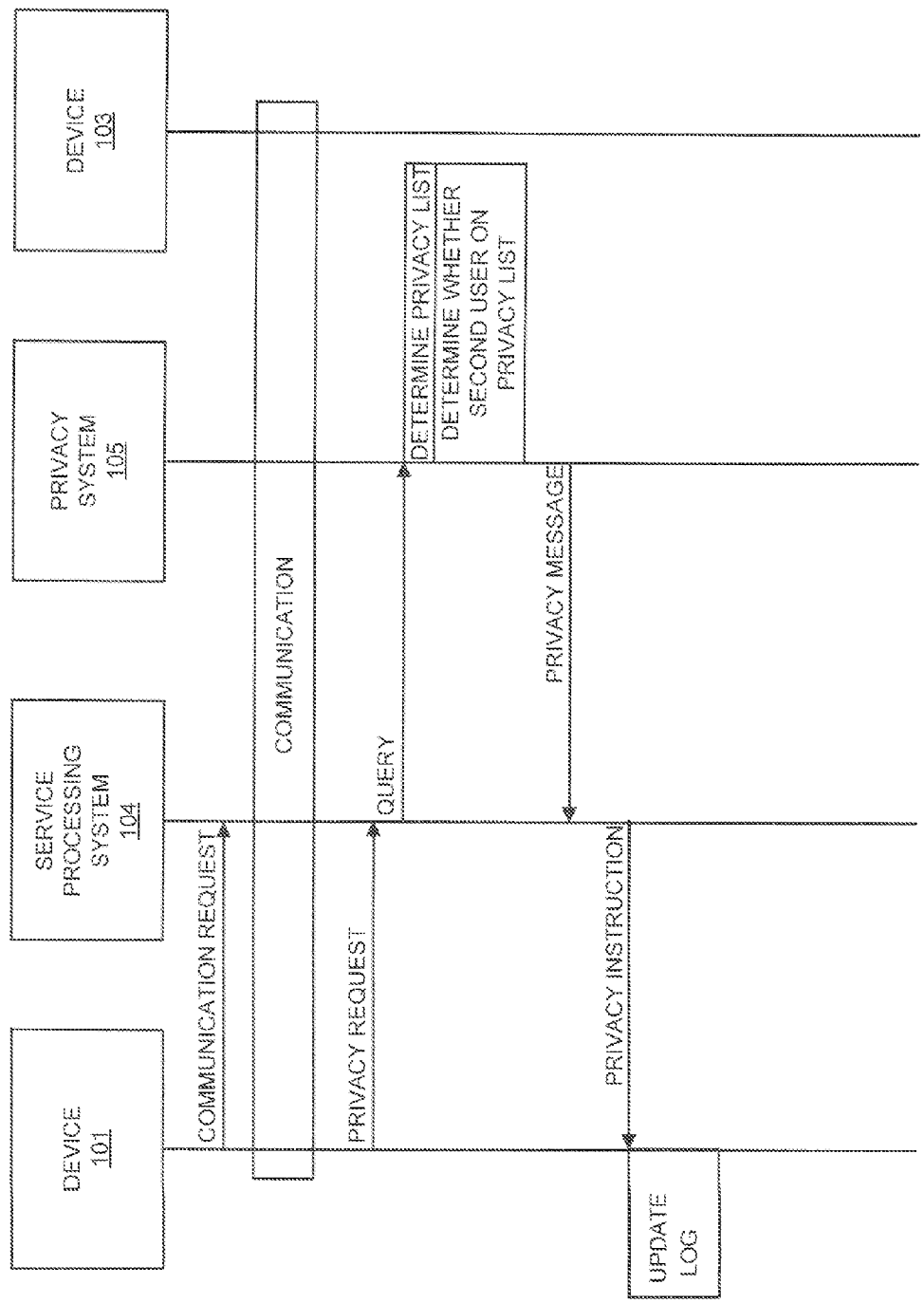
FIG. 3 illustrates the operation of a communications system in an embodiment of the invention.

FIG. 3 illustrates the operation of communications system 100 in an embodiment of the invention. A first user associated with device 101 could utilize a privacy service, wherein the first user could determine a privacy list for communications via device 101. The privacy list could identify users with whom the first user could maintain private communications. For example, device 101 could be a wireless handset, and it is well-known in the art to maintain a log of outgoing communications on a wireless handset. The log could be a dialed number log, a text message log, a mailbox for sent e-mails, or an IRC log. By utilizing a privacy service, the first user could predetermine a set of users with whom the first user does not want outgoing communications logged. The first user could have a second user associated with device 103 recorded on the privacy list associated with the first user.

The first user could initiate a communication via device 101 to the second user associated with device 103. Once the communication is completed, device 101 could send a privacy request to service processing system 104. In response, service processing system 104 could send a query to privacy system 105 indicating the communication. Privacy system 105 could determine the privacy list for the first user, based on the query received from service processing system 104. Privacy system 105 could determine whether the second user is on the privacy list associated with the first user and send a privacy message to service processing system 104. Service processing system 104 could receive the privacy message and send a privacy instruction to device 101.

Device 101 could update the outgoing communications log, wherein according to the privacy instruction, the second user is not indicated. The update to the log could be completed by removing from the log the dialed number, text message, sent e-mail, or IRC message; changing the content of the dialed number, text message, e-mail, or IRC; or changing the identifier of the second user on the outgoing communications log.

Figure 4:
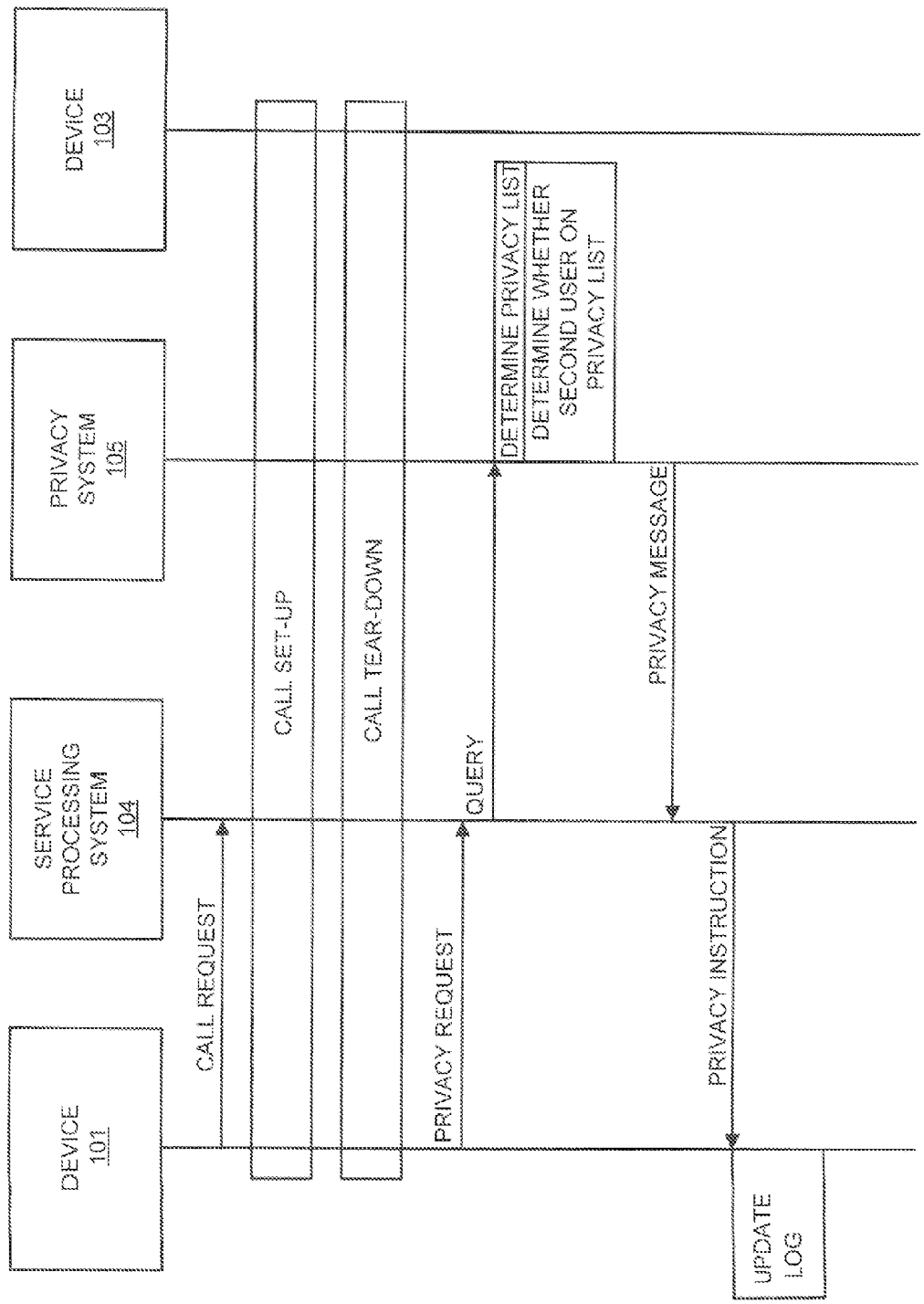
FIG. 4 illustrates the operation of a communications system in an embodiment of the invention.

FIG. 4 illustrates operation of communications system 100 in an embodiment of the invention. A first user associated with device 101 could utilize a privacy service, wherein the first user could determine a privacy list for communications via device 101. The privacy list could identify users with whom the first user could maintain private communications. For example, device 101 could be a telephone, and it is well-known in the art to maintain a log of dialed numbers on a telephone. By utilizing a privacy service, the first user could predetermine a set of users with whom the first user does not want call occurrences logged. The first user could have a second user associated with device 103 recorded on the privacy list associated with the first user.

The first user could place a call via device 101 to a second user associated with device 103. Once the call is completed, device 101 could send a privacy request to service processing system 104. In response, service processing system 104 could send a query to privacy system 105 indicating the call. Privacy system 105 could determine the privacy list for the first user, based on the query received from service processing system 104. Privacy system 105 could determine whether the second user is on the privacy list associated with the first user and send a privacy message to service processing system 104. Service processing system 104 could receive the privacy message and send a privacy instruction to device 101.

Device 101 could update the dialed numbers log, wherein according to the privacy instruction, the second user is not indicated. The update to the log could be completed by removing the dialed number from the log, or changing the dialed number of the second user on the log.

Figure 5:
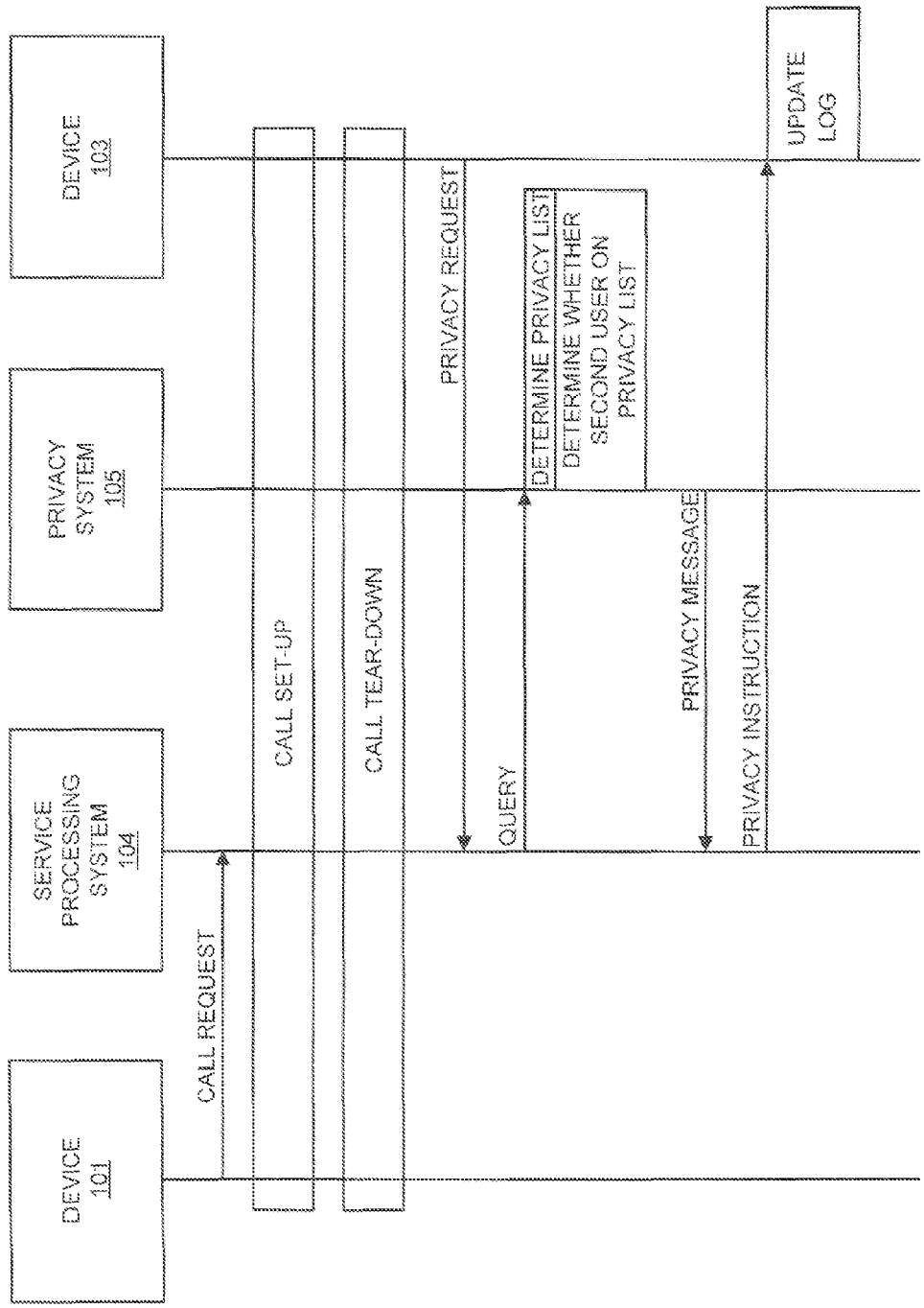
FIG. 5 illustrates the operation of a communications system in an embodiment of the invention.

FIG. 5 illustrates operation of communications system 100 in an embodiment of the invention. A first user associated with device 103 could utilize a privacy service, wherein the first user could determine a privacy list for communications via device 103. The privacy list could identify users with whom the first user will maintain private communications. For example, device 103 could be a telephone, and it is well-known in the art to maintain a log of incoming calls to device 103.

The second user could place a call via device 101 to the first user associated with device 103. Service processing system 104 could perform call set-up between device 101 and device 103. When the call between device 101 and device 103 terminates, service processing system 104 could perform call tear-down between device 101 and device 103. After call tear-down, device 103 could send a privacy request to service processing system 104. In response, service processing system 104 could send a query to privacy system 105. Privacy system 105 could determine the privacy list for the first user, and whether the second user is on the privacy list. Privacy system 105 could then send a privacy message to service processing system 104. Service processing system 104 could receive the privacy message and send a privacy instruction to device 103.

Device 103 could update the incoming call log, wherein according to the privacy instruction, the second user is not indicated. The update to the log could be completed by removing the telephone number associated with the second user, or changing the telephone number of the second user on the log.

Figure 6:
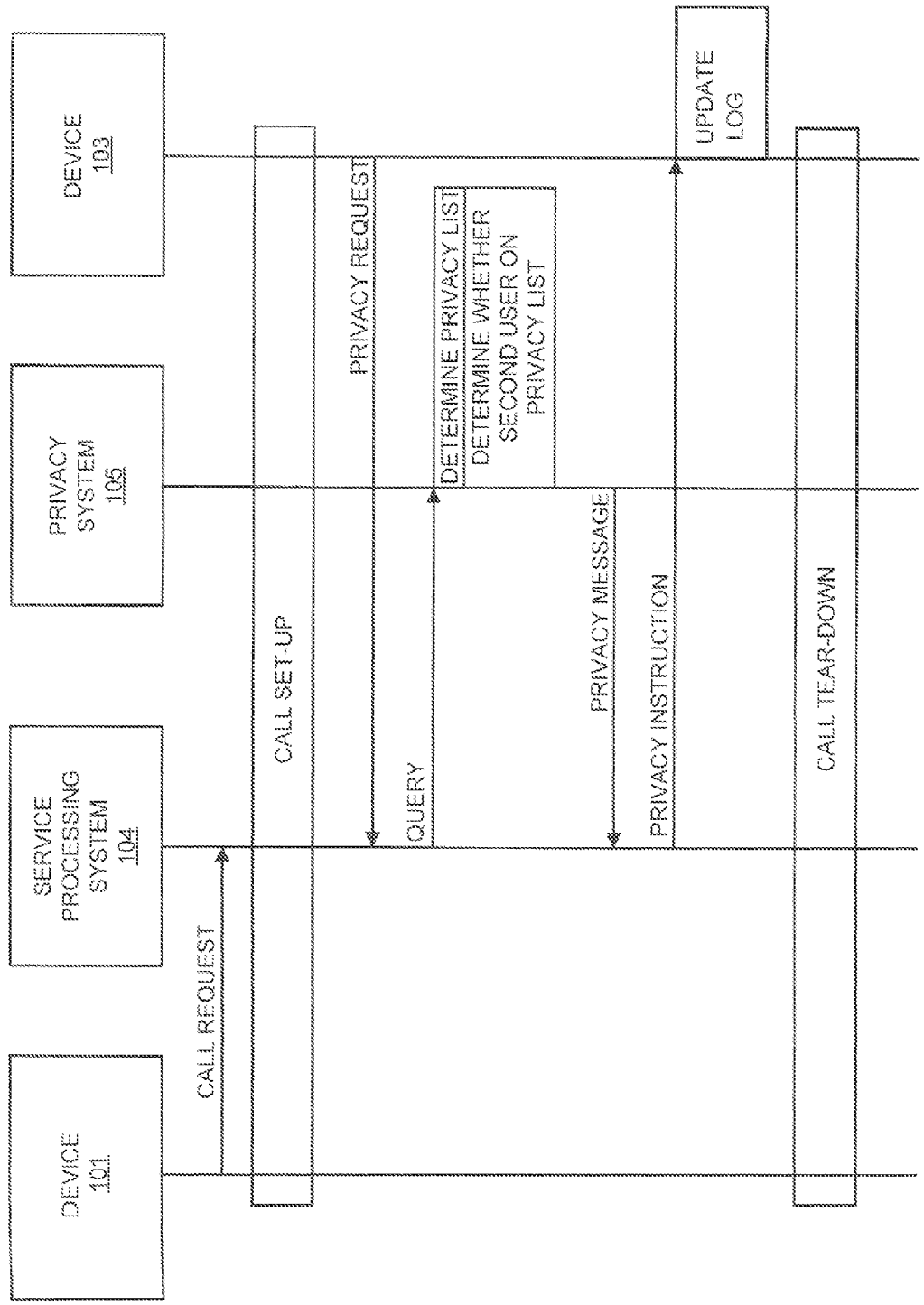
FIG. 6 illustrates the operation of a communications system in an embodiment of the invention.

FIG. 6 illustrates operation of communications system 100 in an embodiment of the invention. A first user associated with device 103 could utilize a privacy service, wherein the first user could determine a privacy list for communications via device 103. The privacy list could identify users with whom the first user will maintain private communications. For example, device 103 could be a telephone, and it is well-known in the art to maintain a log of incoming calls to device 103.

The second user could place a call via device 101 to the first user associated with device 103. Service processing system 104 could perform call set-up between device 101 and device 103. After call set-up, device 103 could send a privacy request to service processing system 104. In response, service processing system 104 could send a query to privacy system 105. Privacy system 105 could determine the privacy list for the first user, and whether the second user is on the privacy list. Privacy system 105 could then send a privacy message to service processing system 104. Service processing system 104 could receive the privacy message and send a privacy instruction to device 103.

Device 103 could update the incoming call log, wherein according to the privacy instruction, the second user is not indicated. The update to the log could be completed by removing the incoming number, or changing the incoming number of the second user. When the call between device 101 and device 103 terminates, service processing system 104 could perform call tear-down between device 101 and device 103.

Advantageously, a user desiring to maintain private communications can utilize a privacy system. The privacy system could ensure that logs of both incoming and outgoing communications maintain the privacy of the participants.

Second Embodiment

FIG. 7

Figure 7:
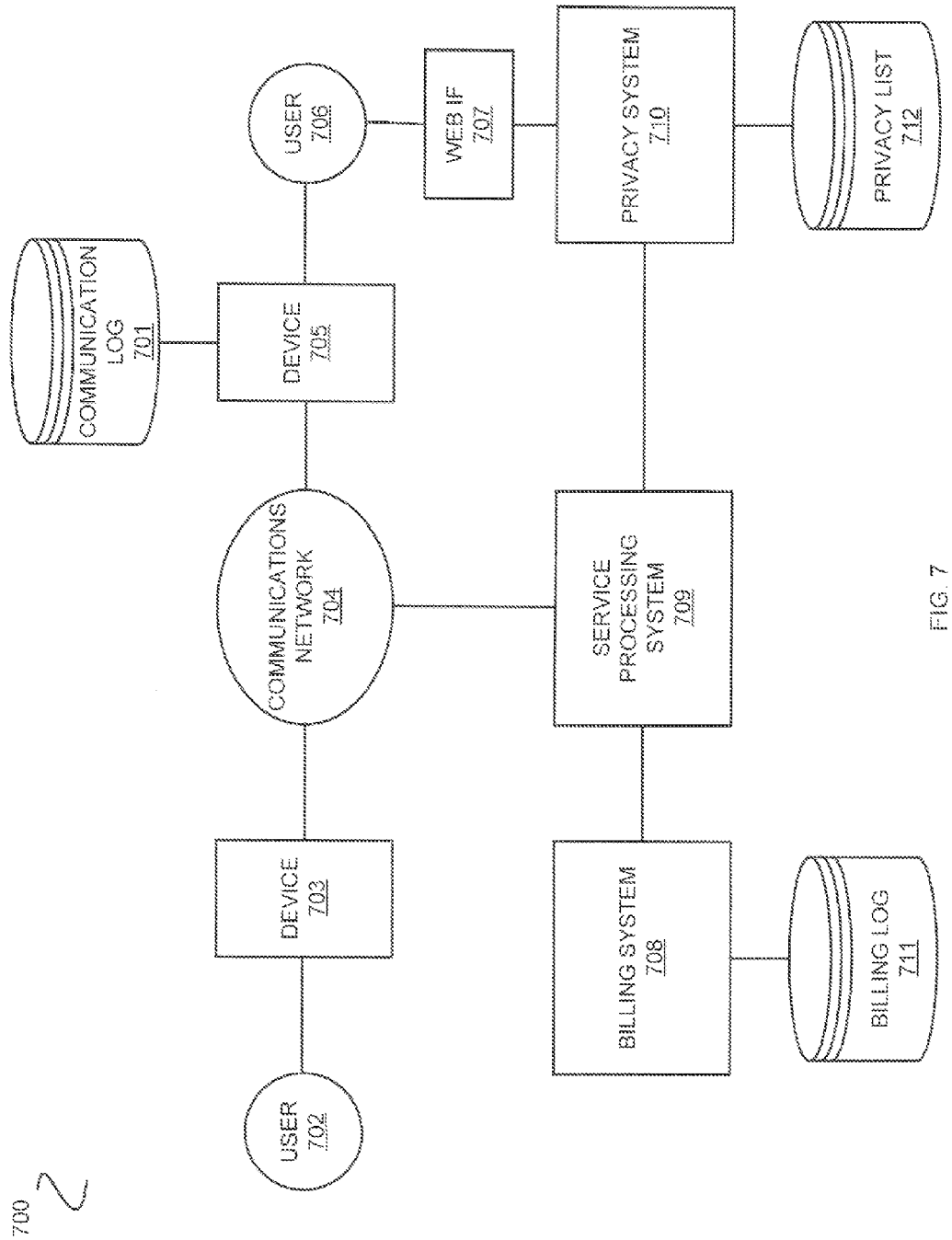
FIG. 7 illustrates a communications system in an embodiment of the invention.

FIG. 7 illustrates communications system 700 in an embodiment of the invention. Communications system 700 could include communication log 701, user 702, device 703, communications network 704, device 705, user 706, web interface 707, billing system 708, service processing system 709, privacy system 710, billing log 711, and privacy list 712.

Communication log 701 could be connected to device 705. User 702 could be connected to device 703. Device 703 could be connected to user 702, and communications network 704. Communications network 704 could be connected to device 703, device 705, and service processing system 709. Device 705 could be connected to communications network 704, communications log 701, and user 706. User 706 could be connected to device 705 and web interface 707. Web interface 707 could be connected to user 706 and privacy system 710. Billing system 708 could be connected to billing log 711 and service processing system 709. Service processing system 709 could be connected to billing system 708, communications network 704, and privacy system 710. Privacy system 710 could be connected to web interface 707, service processing system 709, and privacy list 712. Billing log 711 could be connected to billing system 708. Privacy list 712 could be connected to privacy system 710.

Communication log 701 could be any data structure capable of storing information relevant to incoming or outgoing communications via device 705. Device 703 and device 705 could be communications devices. Examples of communications devices are telephones, personal computers, and wireless handsets.

Communications network 704 could be any network or collection of networks that facilitate telephone or data communications. The public switched telephone network (PSTN), wireless communications networks, and the Internet are examples of communications networks.

Web interface 707 could be any combination of software, including but not limited to Java, XML, and HTML, capable of presenting a graphical user interface (GUI) to a user 706, receiving update messages from user 706, and sending update requests to privacy system 710 for maintaining a privacy list associated with user 706.

Billing system 708 could be any data processing system capable of tracking communications usage for user 702 via device 703 or user 706 via device 705 over communications network 704 and service processing system 709.

Service processing system 709 could be any system that is capable of communication functionality. Communication functionality includes telephone call set-up, call termination, text messaging, e-mail, and IRC services. A mobile switching center (MSC), a telephone switch, a soft-switch, and servers for text-messaging, e-mail and internet relay chat (IRC) are examples of service processing systems.

Privacy system 710 could be any system capable of maintaining a privacy list via a web interface, determining privacy list 712 for a first user, receiving queries indicating a communication comprising a second user and a first user, determining whether the second user is on privacy list 712, and sending a privacy message to service processing system 709.

Billing log 711 could be any data structure capable of storing information relevant to communications for user 702 via device 703 or user 706 via device 705. Privacy list 712 could be any data structure capable of storing information relevant to user 702, user 706, device 703, or device 705 such that information relevant to communications via device 703 and device 705 can be modified within communication log 701 or billing log 711.

In an embodiment of the invention, user 706 could utilize a privacy service. The privacy service could allow user 706 to define a number of other users with whom user 706 wishes to keep communications private.

Device 705 and billing system 708 maintain logs of user 706's communications. Communications log 701 could be lists of communication identifiers such as dialed or incoming telephone numbers, internet protocol (IP) addresses, e-mail addresses; incoming and outgoing e-mail; text messages; and, the contents of IRCs. Billing log 711 could track incoming and outgoing communication identifiers, call length, and the volume of text communications.

To maintain privacy, communication log 701 and billing log 711 for user 706 could be modified to mask every communication with a user 702 associated with device 703. Privacy list 712 could be maintained as a data structure within privacy system 710. Web interface 707 could be established whereby user 706 could define privacy users such as user 702 within privacy list 712. User 706 could also define a privacy method for communications with user 702. Privacy methods could include: deleting communications, deleting communication identifiers, or defining an alternative communication identifier for a privacy user.

When communications take place between user 706 and user 702, device 705 could send a privacy query to service processing system 709. Billing system 708 could also send a privacy query to service processing system 709. Service processing system could send a query to privacy system 710, which in turn could determine privacy list 712 for user 706. Privacy system could determine whether user 702 is on privacy list 712. Privacy system 710 could then send a privacy message to service processing system 709 indicating whether user 702 is on privacy list 712. Service processing system 709 could receive the privacy message and send privacy instructions in separate messages to device 705 via the communications network, and billing system 708.

Device 705 and billing system 708 could update communication log 701 and billing log 711 respectively, such that according to the privacy instruction, user 702 would not be indicated. The updates to communication log 701 and billing log 711 could be completed by deleting or changing e-mail, IRC, or text message contents; deleting user 702's communication identifier, or changing user 702's communication identifier to an alternative communication identifier defined in user 706's privacy list.

Advantageously, a user desiring to maintain private communications, can utilize a privacy system. The privacy system enables the user to define a list of privacy participants, and a method for masking communications with the privacy participants. The privacy system further enables the user to ensure that logs of incoming and outgoing communications both on the device and on related systems maintain the privacy of the participants.

Figure 8:
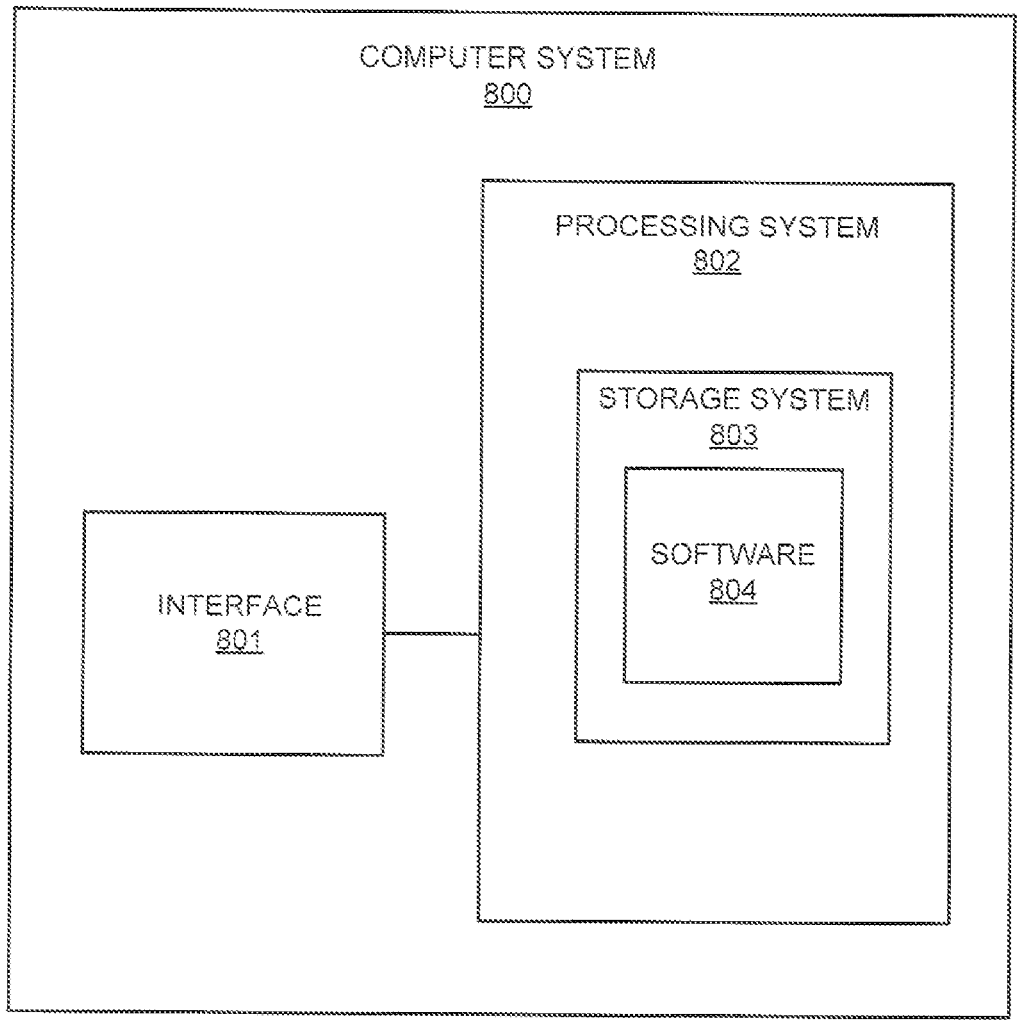
FIG. 8 illustrates an embodiment of the invention.

FIG. 8 illustrates computer system 800 in an embodiment of the invention. Computer system 800 includes interface 801, processing system 802, storage system 803, and software 804. Storage system 803 stores software 804. Processing system 802 is linked to interface 801. Computer system 800 could be comprised of a programmed general-purpose computer, although those skilled in the art will appreciate that programmable or special purpose circuitry and equipment may be used. Computer system 800 may use a client server architecture where operations are distributed among a server system and client devices that together comprise elements 801-804.

Interface 801 could comprise a network interface card, modem, port, or some other communication device. Interface 801 may be distributed among multiple communication devices. Processing system 802 could comprise a computer microprocessor, logic circuit, or some other processing device. Processing system 802 may be distributed among multiple processing devices. Storage system 803 could comprise a disk, tape, integrated circuit, server, or some other memory device. Storage system 803 may be distributed among multiple memory devices.

Processing system 802 retrieves and executes software 804 from storage system 803. Software 804 may comprise an operating system, utilities, drivers, networking software, and other software typically loaded onto a general-purpose computer. Software 804 could also comprise an application program, firmware, or some other form of machine-readable processing instructions. When executed by the processing system 802, software 804 directs processing system 802 to operate as described above for the elements of communications system 100 or communications system 700, such as device 101, device 103, service processing system 104, privacy system 105, device 705, web interface 707, billing system 708, service processing system 709, and privacy system 710.

Those skilled in the art will appreciate variations from these embodiments that fall within the scope of the invention. Those skilled in the art will appreciate that the features described above could be combined in various ways to form multiple embodiments of the invention. As a result, the invention is not limited to the specific embodiments described above, but only by the claims and their equivalents.

The invention claimed is:

1. A communications system comprising:
  a communication interface of a service processing system configured to receive a privacy request from a first communication device indicating a communication comprising a first user associated with the first communication device and a second user associated with a second communication device, send a query indicating the communication to a privacy system, receive a privacy message from the privacy system indicating whether the second user is private, and send a privacy instruction to the first communication device;

a communication interface of the privacy system configured to receive the query;

in response to the query, a processing system of the privacy system configured to select a privacy list for the first user from a plurality of privacy lists associated with a plurality of users, and process the query with the privacy list to determine whether the second user is on the privacy list;

the communication interface of the privacy system configured to send the privacy message to the service processing system indicating that the second user is private;

the first communication device in wireless communication with the service processing system via a communication network and configured to receive the privacy instruction, and update a log indicating the communication to not indicate the second user for the communication by at least changing a phone number for the second user in the log; and the communication interface of the service processing system configured to send the privacy instruction to a billing system, wherein the billing system updates a billing log to not indicate the second user for the communication.

2. The communications system of claim 1 wherein the first communication device is further configured to send the privacy request, and wherein the privacy request comprises a Short Message Service (SMS).

3. The communications system of claim 1, where the first user updates the privacy list via a web interface.

4. The communications system of claim 1, where the communication interface of the service processing system receives the privacy request when the communication terminates.

5. The communications system of claim 1, where the log is an outgoing call log, an incoming call log, or a missed call log.

6. The communications system of claim 1, where the communication is a telephone call.

7. The communications system of claim 1, where the communication is a voice over internet protocol (VOIP) call.

8. The communications system of claim 1, where the communication is a text message.

9. The communications system of claim 1, where the communication is an e-mail.

10. A method of operating a communication system, the method comprising:

in a service processing system:
receiving a privacy request from a first communication device indicating a communication comprising a first user associated with the first communication device and a second user associated with a second communication device;
sending a query indicating the communication to a privacy system;
receiving a privacy message from the privacy system indicating whether the second user is private; and
sending a privacy instruction to the first communication device;

in a privacy system:
receiving the query;
in response to the query, selecting a privacy list for the first user from a plurality of privacy lists associated with a plurality of users;
processing the query with the privacy list to determine whether the second user is on the privacy list; and
sending the privacy message to the service processing system indicating that the second user is private; and
sending the privacy instruction to a billing system, wherein the billing system updates a billing log to not indicate the second user for the communication; and in the first communication device:
receiving the privacy instruction; and
updating a log indicating the communication to not indicate the second user for the communication by at least changing a phone number for the second user in the log;
wherein the first communication device is in wireless communication with the service processing system via a communication network.

11. The method of claim 10, wherein the first communication device is further configured to send the privacy request, and wherein the privacy request comprises a Short Message Service (SMS).

12. The method of claim 10 further comprising the first user updating the privacy list via a web interface.

13. The method of claim 10 further comprising the service processing system receiving the privacy request when the communication terminates.

14. The method of claim 10, where the log is an outgoing call log, an incoming call log, or a missed call log.

15. The method of claim 10, where the communication is a telephone call.

16. The method of claim 10, where the communication is a voice over internet protocol (VOIP) call.

17. The method of claim 10, where the communication is a text message.

18. The method of claim 10, where the communication is an e-mail.

19. A non-transitory computer-readable storage medium, having instructions stored thereon for operating a communications system, wherein execution of the instructions by one or more processors causes the one or more processors to:

in a service processing system:
receive a privacy request from a first communication device indicating a communication comprising a first user associated with a first communication device and a second user associated with a second communication device;
send a query indicating the communication to a privacy system;
receive a privacy message from the privacy system indicating whether the second user is private; and
send a privacy instruction to the first communication device;

in a privacy system:
receive the query;
in response to the query, select a privacy list for the first user from a plurality of privacy lists associated with a plurality of users;
process the query with the privacy list to determine whether the second user is on the privacy list; and
send the privacy message to the service processing system indicating that the second user is private; and
send the privacy instruction to a billing system, wherein the billing system updates a billing log to not indicate the second user for the communication; and in the first communication device:
receive the privacy instruction; and update a log indicating the communication to not indicate the second user for the communication by at least changing a phone number for the second user in the log;

wherein the first communication device is in wireless communication with the service processing system via a communication network.

* * * * *